Feb. 5, 1957 K. E. FARR ET AL 2,780,668
SYNCHRONIZING SYSTEM FOR COLOR TELEVISION
Filed Oct. 21, 1952
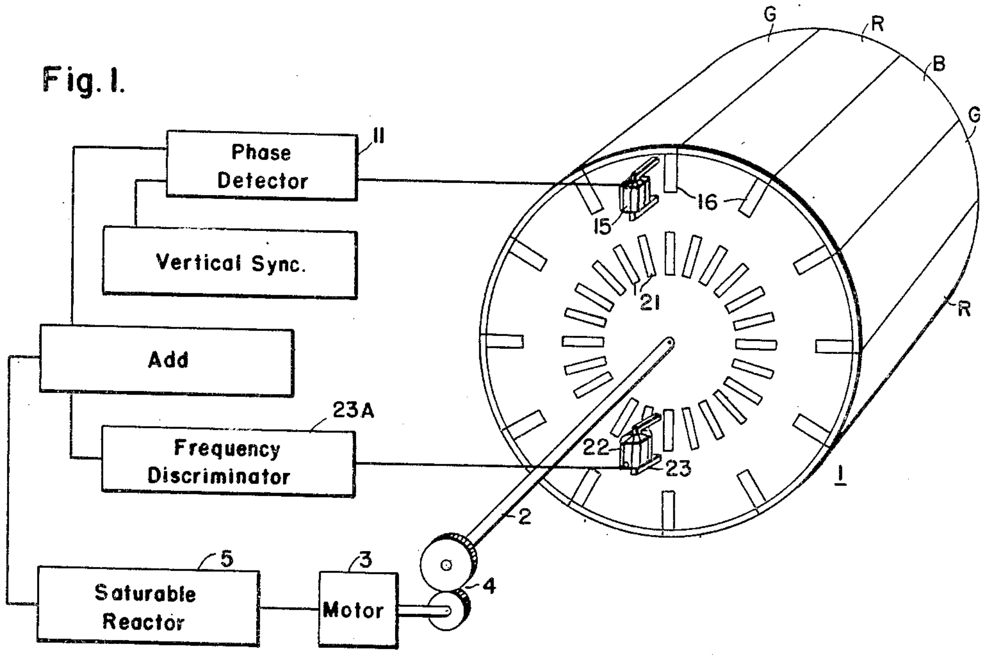
Fig. I.
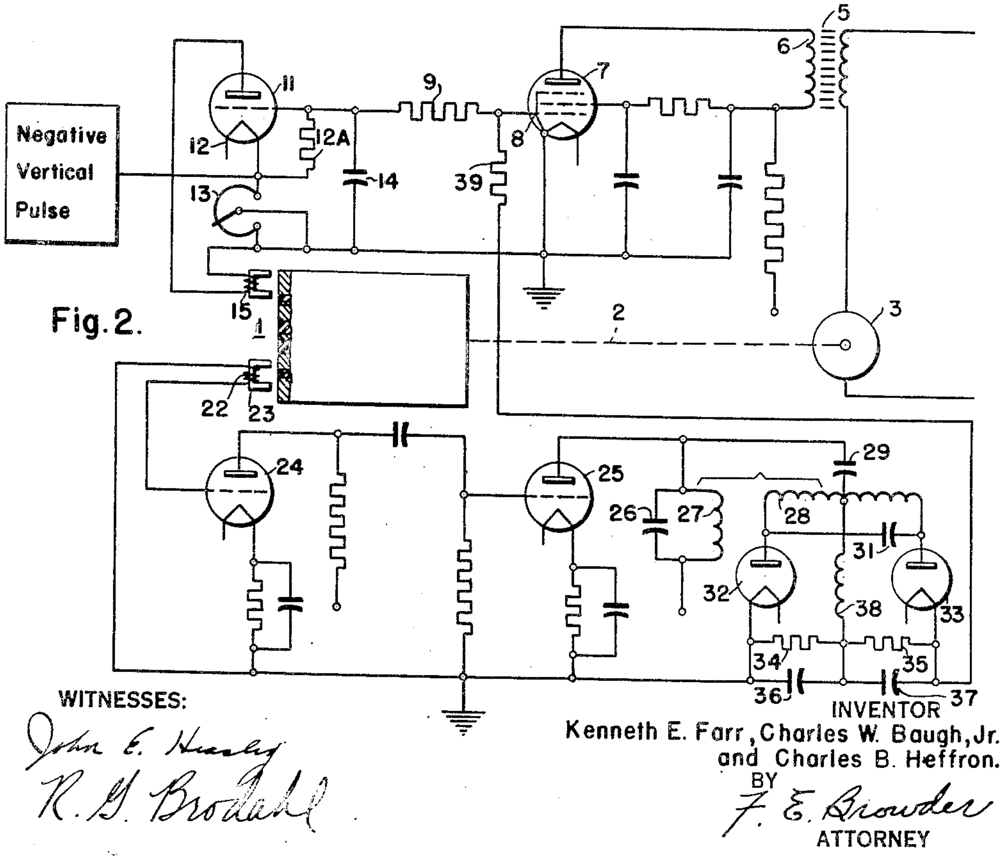
Fig. 2.
WITNESSES:
John E. Healy
R. G. Brodahl
INVENTOR
Kenneth E. Farr, Charles W. Baugh, Jr. and Charles B. Heffron.
BY
F. E. Browder
ATTORNEY 2,780,668
Patented Feb. 5, 1957

2,780,668

SYNCHRONIZING SYSTEM FOR COLOR TELEVISION

Kenneth E. Farr, Paxinos, Pa., and Charles W. Baugh, Jr., Princeton, and Charles B. Heffron, Metuchen, N. J., assignors to Westinghouse Electric Corporation, East Pittsburgh, Pa., a corporation of Pennsylvania Application October 21, 1952, Serial No. 315,961

3 Claims. (Cl. 178—5.4)

Our invention relates to television receivers and in particular to receivers in which red, blue and green filters are moved between the eyes of the observer and the picture-screen of a black-and-white picture tube in synchronism with transmissions of successive frames of corresponding color at the sending end. The observer thus sees the red-light areas of the picture in the picture in the red-filtered lights, the blue-light areas in blue-filtered light, and the green-light areas in green-filtered lights successively and gets the impression of seeing one true-colored picture. The color television system in widest public use today operates in this way.

In any such system, the receiver screen is scanned in horizontal lines starting at the top and ending at the bottom by an electron-beam which renders the screen luminous at the spot, where at any instant, it is incident. This luminosity does not disappear instantly, however, but dies away gradually enough so that, as the spot proceeds across the front of the screen, several preceding lines which it has just scanned remain luminous and visible to the observer. To present true color to the observer the red filter, for example, must always cover this entire luminous screen-area as it moves from the top to the foot of the screen, and this means either that the red filter must cover the entire screen during the reception of its correspondingly-colored frame (which would require the filter to move intermittently), or that a filter be accurately timed to move continuously across the face of the picture-tube screen with its advancing edge always ahead of the screen line which the luminous spot is scanning as it moves toward the foot of the screen. Since intermittent movement of filters which are large enough to cover anything like the sixteen-inch-diameter screens now in wide public demand, would require impracticably costly mechanism, filters mounted on a continuously rotating disc or drum are used; and this requires extremely accurate synchronization of the rotating member with the color-frame transmission coming into the receiver.

A "vertical synchronizing pulse" is sent by the television transmitter in the interval between each two frames to insure that the scanning-beam in the receiving picture-tube starts to scan the uppermost line of the receiver at the same instant that the scanning-beam at the transmitter starts intensity signals for the uppermost line of the picture there; and we employ this so-called "vertical synchronizing pulse" to control the speed and phase-position of the rotor of an electric motor driving the filter-drum to accurately synchronize the filters with the incoming color-frames.

One object of our invention is accordingly to control the speed of a moving filter in a color-television picture-receiver to maintain proper timing of the filters with the transmitted picture-signals.

Another object of our invention is to maintain a moving filter in a color-television receiver in proper phase with transmitted picture signals.

Another object of our invention is to control a motor which rotates a filter-support in a color-television receiver so that the speed and phase of its rotor are maintained at desired values relative to the timing of the received picture-signals.

Still another object is to provide a rotary drive for filters in a color-television receiver which is maintained in phase-synchronism with incoming picture signals through the agency of the vertical synchronizing pulses transmitted between frames of the picture.

Other objects of our invention will become evident upon reading the following description taken in connection with the attached drawing, in which Figure 1 is a schematic representation employing block-diagrams of a filter-drive embodying the principles of our invention; and, Fig. 2 is a more detailed schematic diagram of a control circuit suitable for employment with the arrangement of Fig. 1.

Referring in detail to Fig. 1 and Fig. 2, groups of three filters, each group R, B and G, respectively, transmitting red, blue and green light, are mounted on the surface of a drum 1 with their long edges forming edges of a regular prism. A shaft 2 supported in suitable bearings (not shown) is positioned at the central axis of the drum and is rotated by a motor 3 through a suitable gearing 4. A kinescope (not shown) of the type used to reproduce ordinary black-and-white television pictures is supported inside drum 1 so that its end-screen is viewed through the filters R, B and G as they move past it successively. The motor 3 may be of any suitable type, such as a capacitor-start induction motor, designed for energization from a commercial house-lighting service such as the sixty cycle alternating current which is standard throughout this country, through the alternating current windings of a saturable reactor 5 the impedance of which is controlled by a direct-current winding 6.

The winding 6 is traversed by the plate current of an amplifier 7 which we show as a pentode with conventional circuits and having a control-electrode 8 which is connected through a resistor 9 to the output of a phase-detector 11. The latter may comprise a triode having a control grid connected to resistor 9 and to its cathode 12 through resistor 12A; the cathode 12 is grounded through a resistor 13. The control-grid of tube 11 is connected to ground through a capacitor 14, and its anode is grounded through winding 15 in which voltage pulses are induced by iron slugs 16 carried near the rim of drum 1. The cathode resistor 13 of phase-detector tube 11 is impressed with the vertical synchronizing pulses coming into the receiver and these are poled to make cathode 12 negative to ground.

The slugs 16 are positioned around the rim of drum 1 adjacent to each filter R, B and G and are so shaped that when the drum 1 is turning at its operative speed a sharp voltage pulse is induced in the winding 15 just after the edge of a moving filter passes the upper margin of the picture area on the receiving-tube screen. The motor 3 is designed to turn the drum 1 at such a speed that the advancing edge of a filter moves down past the picture screen at the same speed as the luminous spot progresses line by line down the screen in scanning it, and the edge of the next filter similarly starts down the screen just as the luminous spot starts downward to scan for the next picture-frame. A filter of one of the three colors R, B or G thus covers the luminous lines which the scanning-spot has just laid down on the screen as each frame is scanned, and a new filter comes into line between the screen and the observer's eyes just when a vertical synchronizing pulse signals that the next frame is about to start.

However, with suitable phosphors for the picture tube, a drum speed of 720 R. P. M. may be used and 12 filter segments. Short persistance phosphors suitable for this purpose are well known in the art. Under these conditions the trailing edge of a filter segment is started down the screen when the luminous spot starts the downward scan of the picture tube, i. e., the leading edge of the latter filter segment is approximately one-half the way down the face of the picture tube when the scan begins. Therefore, the luminous spot, which is traveling at twice the vertical speed of said filter segment is covered by the trailing edge of the filter segment as the vertical scan begins, and is covered by the leading edge at the end of the vertical scan. The next adjacent filter segment is now in position such that its trailing edge will cover the luminous spot as the next vertical scan begins. With a drum speed of 720 R. P. M., a new filter moves between the screen and an observer's eyes just after the scan begins for the previous filter segment.

The conditions just laid down for a drum speed of 1440 R. P. M. will be met if the motor 3 is controlled in speed so as to move the distance between the advance edge of one filter and the advance edge of the next in one frame-period of the television transmission, and if the pulses induced in winding 15 coincide in time with the vertical synchronizing pulses coming into the receiver. The phase detector 11 is designed to maintain such synchronism between these two pulses as will be explained more fully below following the description of the circuit for attaining the required driving-motor speed.

The speed control function is performed by what is in effect an alternating current generator comprising a series of iron slugs 21 carried by the drum 1 and an armature coil or winding 22 supported on a stationary iron core 23 positioned adjacent the path of said iron slugs. When the drum 1 rotates the slugs 21 induce a voltage in winding 22 the frequency of which is above a certain value when the speed is above the requisite value mentioned above and below that value when the speed is too low. The voltage of winding 22 is fed to a frequency discriminator 23A of any suitable type, such as that known as the "Seely-Foster discriminator" which has an output voltage which is zero at the critical frequency, is positive for higher frequencies and negative at lower frequencies. The discriminator 23A may comprise an amplifier 24 feeding a second amplifier 25 which has in its plate circuit an anti-resonant capacitor 26 and inductor 27 which are tuned to the frequency generated when drum 1 rotates at the desired speed mentioned above. Loosely coupled magnetically to inductor 27 is a second inductor 28 having its midpoint connected through a capacitor 29 to the anode of tube 25. The winding 28 is tuned to the same frequency as inductor 27 by a capacitor 31. Two diodes 32, 33 have their anodes connected to the ends of inductor 28 and their cathodes interconnected by a pair of similar resistors 34, 35 shunted respectively by a pair of similar capacitors 36, 37. The midpoint of capacitors 36, 37 is connected through an inductor 38 to the mid-terminal of winding 28, and the cathode of tube 32 is connected to ground. The cathode of tube 33 is connected through a resistor 39 to the grid 8 of amplifier 7.

The properties of the network comprising elements 26 through 29 and 31 through 38 are such that when the frequency generated in winding 22 is that to which the anti-resonant pair 26—27 is tuned the voltage-drop between the cathodes of tubes 32 and 33 is zero. If at any time the speed of drum 1 falls below the value required to bring a new filter into position in front of the picture tube screen for every new frame, the voltage of the cathode of tube 33 becomes positive to ground thus making the control electrode of amplifier 7 more positive, increasing its output current. This reduces the impedance drop through saturable reactor 5, so increasing the alternating voltage impressed on motor 3 and increasing its speed. When its speed attains the required value at which the voltage of the cathode of diode 33 relative to ground is zero the saturable reactor 5 re-acquires the impedance at which the motor 3 is no longer accelerated.

The statements just made ignore the fact that the phase-detector tube 11 and the vertical synchronizing pulses are being impressed on the control electrode 8, and hence they do not tell the whole story. The voltage induced in winding 15 as the slugs 16 pass it is of course alternating. By properly positioning the winding 15 along the path over which the slugs are moving, the time in the cycle of motion of each filter past the picture-tube screen, at which this alternating voltage passes through zero may be fixed at will. The alternating voltage from inductor 15 and the voltage-drop produced by the incoming vertical synchronizing pulses in resistor 13 are impressed in series with each other between the anode and cathode of tube 11, and will send a current through the latter and resistor 13 which depends in magnitude on their instantaneous sum. Thus the voltage impressed by resistor 13 on the control electrode of tube 7, and consequently the current sent by the latter through the saturating winding 6 of reactor 5, will depend upon the phase of this alternating voltage relative to the vertical synchronizing pulse. Thus the accelerating torque applied by the power source to motor 3 is a function of the relative phase of the vertical synchronizing pulse and the alternating voltage of inductor 15; and under these conditions there is a lock-in value of phase at which the motor will stabilize, accelerating if the alternating voltage tends to fall behind this value and retarding if the alternating voltage tried to lead it. By positioning the inductor 15 so that the leading edge of a filter has just passed the upper edge of the picture screen when the vertical synchronizing pulse signals the commencement of a new frame of the picture, the proper filtering of the successive frames for the observer's eyes is assured. In other words, proper synchronization of the color drum with the incoming television signals is obtained.

In this latter respect, it should be pointed out that for a drum speed of 720 R. P. M., the inductor member 15 must be so positioned that the trailing edge of a filter segment is approaching the upper edge of the picture screen when a vertical synchronizing pulse occurs.

We claim as our invention:

1. In a television receiver, a picture screen on which incoming signals successively portray images of the red, blue and green light fields composing the scene to be reproduced, movable filters respectively transmitting red, blue and green light, a rotor bearing said filters and driving means for said rotor having electrical windings, an impedance having a direct current control winding connected to said electrical windings first means including inductor windings and, a magnetic body moved in inductive relation to said inductor windings by said rotor to generate voltage in said inductor windings, second means to generate a voltage having a frequency proportional to the speed of said rotor, a phase discriminator having its input energized by said inductor windings, and a frequency discriminator having its input energized by said second means, the outputs of said phase discriminator and said frequency discriminator being connected to energize said direct current control winding.

2. In a television receiver, a picture screen on which incoming signals successively portray images of the red, blue and green light fields composing the scene to be reproduced, movable filters respectively transmitting red, blue and green light, first means including a motor having a driving winding for moving said filters to register successively with said screen, an impedance having a direct current control winding connected to said driving winding, second means including inductor windings and a magnetic body moved in inductive relation to said inductor windings by said first means to generate voltage in said inductor windings, third means to generate a voltage having frequency proportional to the speed of said motor, a phase discriminator having its input energized by said inductor windings, and a frequency discriminator having its input energized by said third means, the outputs of said phase discriminator and said frequency discriminator being connected to energize said direct current control winding.

3. A color television adapter comprising a rotor bearing a plurality of groups each comprising a red, blue and green transmitting filter, a motor having electrical energizing windings for driving said rotor, a reactor having a direct current control winding governing current flow through said energizing windings, a magnetic body on said rotor for each said group, a stationary inductor winding in inductive relation with the path traversed by said magnetic body, a set of magnet poles spaced in a circle about the center of said rotor, a stationary armature winding in inductive relation with said magnet poles, a phase discriminator having one of its input terminals energized by said inductor winding, and a frequency discriminator having its input energized by said armature winding, the outputs of said phase discriminator and said frequency discriminator being connected to energize said direct current control winding.

References Cited in the file of this patent

UNITED STATES PATENTS

| | | |
|---|---|---|
| 2,317,989 | Goldmark | May 4, 1943 |
| 2,351,759 | Grundmann | June 20, 1944 |
| 2,428,946 | Somers | Oct. 14, 1947 |
| 2,509,730 | Dome | May 30, 1950 |
| 2,635,142 | Wagenknecht | Apr. 14, 1953 |
| 2,644,032 | Maher | June 30, 1953 |
| 2,645,678 | Christensen | July 14, 1953 |